No. 773,572.  
PATENTED NOV. 1, 1904.  
J. R. KNAPP.  
VEHICLE PROPELLING MECHANISM.  
APPLICATION FILED MAY 21, 1903.  
NO MODEL.  
2 SHEETS—SHEET 1.
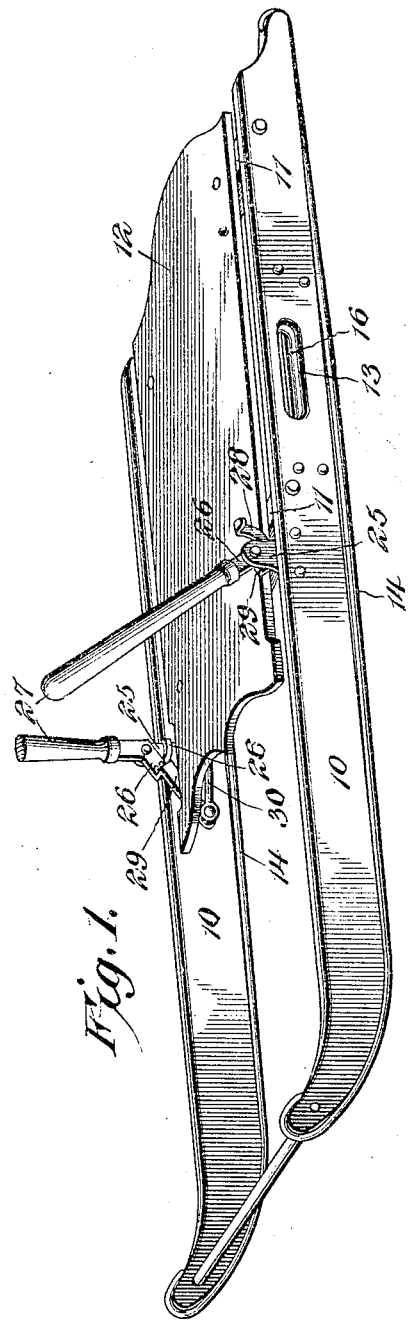
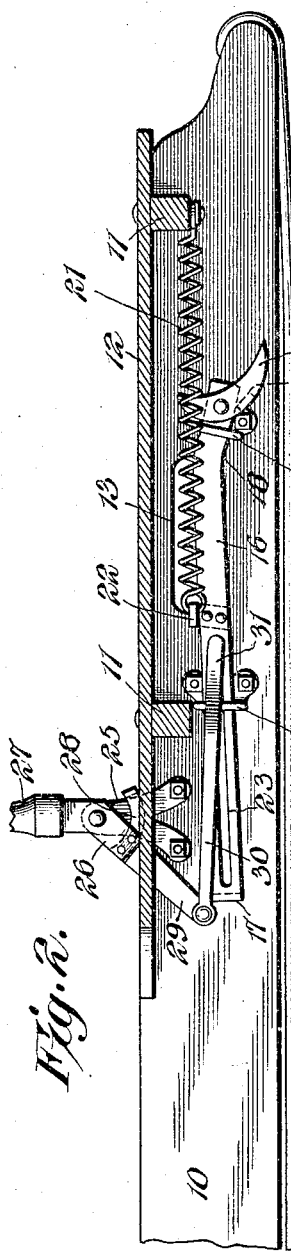
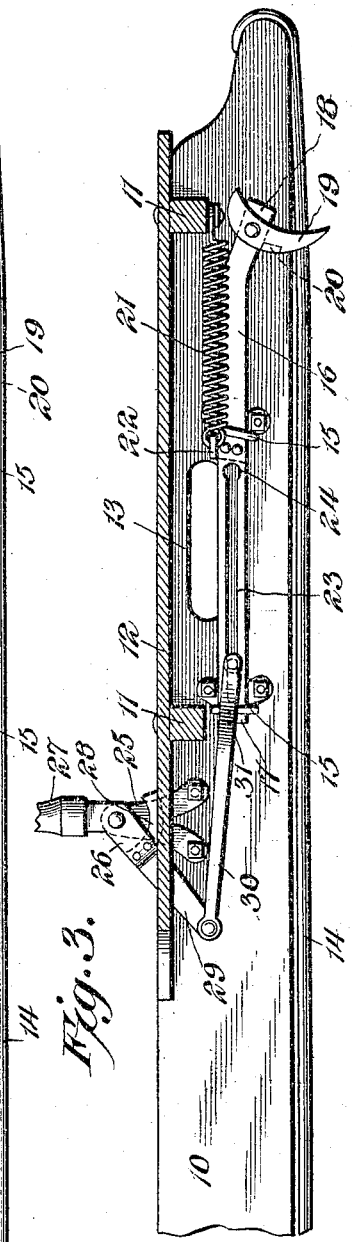
Witnesses  
Howard D. Orr  
B. G. Foster
J. R. Knapp, Inventor,  
By E. G. Siggers,  
Attorney

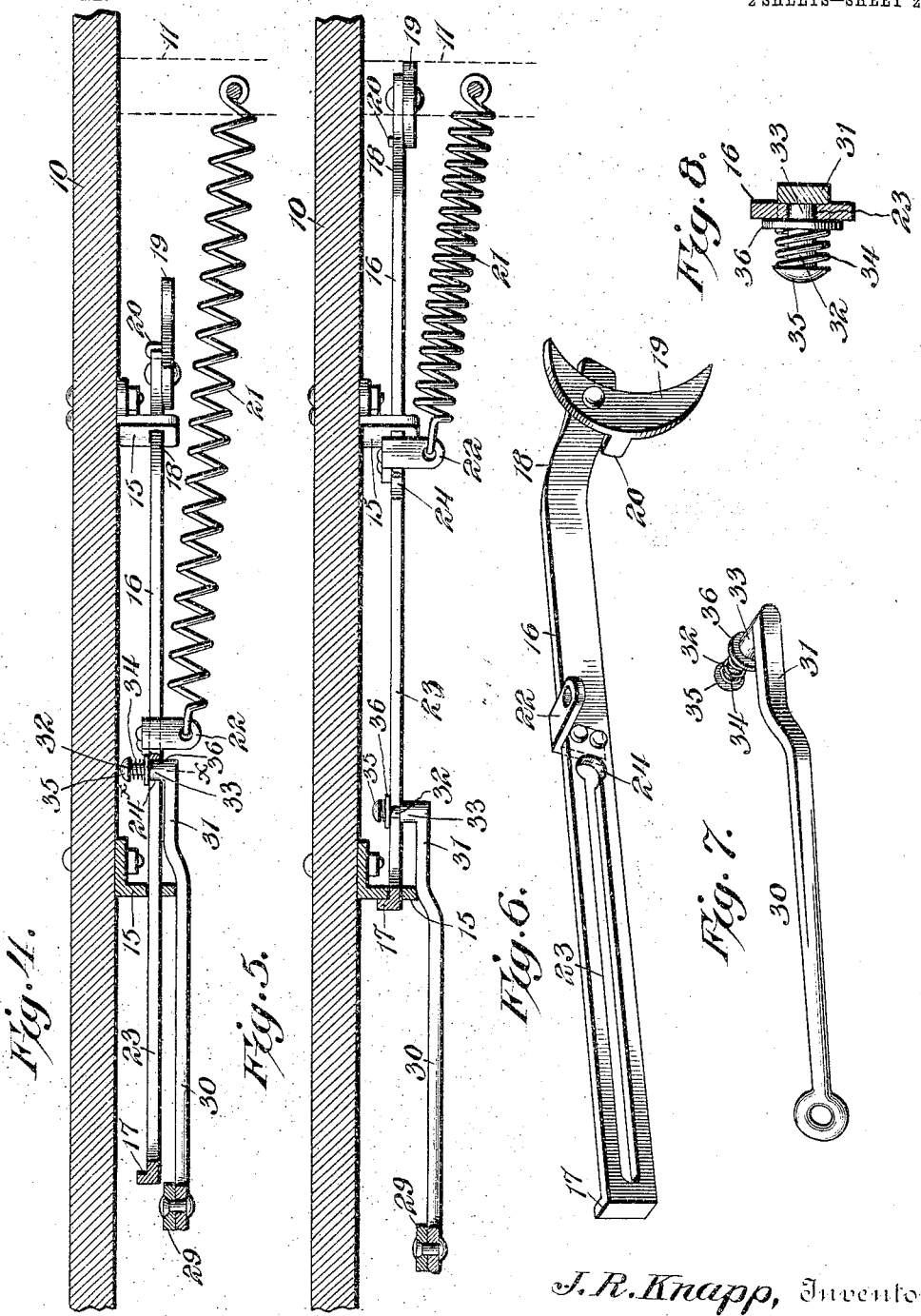

No. 773,572.

Patented November 1, 1904.

UNITED STATES PATENT OFFICE.

JEREMIAH R. KNAPP, OF NORWALK, OHIO, ASSIGNOR TO JOHN W. RISSER, OF NORWALK, OHIO.

VEHICLE PROPELLING MECHANISM.

SPECIFICATION forming part of Letters Patent No. 773,572, dated November 1, 1904.

Application filed May 21, 1903. Serial No. 158,174. (No model.)

*To all whom it may concern:*

Be it known that I, JEREMIAH R. KNAPP, a citizen of the United States, residing at Norwalk, in the county of Huron and State of Ohio, have invented a new and useful Vehicle Propelling Mechanism, of which the following is a specification.

The present invention relates to vehicle propelling mechanism, and while particularly designed for use upon sleds it will readily be seen that certain features are applicable to vehicles of other classes.

One of the objects of the invention is to provide simple means which can be applied to an ordinary hand-sled or other vehicle and can be manually operated to propel said vehicle readily and without undue effort. It is also the object to construct this means so that it will not interfere with the movement of the sled or act as a drag thereon when not in operation. As a result the vehicle will have free movement when coasting or progressing under its own momentum.

Furthermore, the parts are very simple in their structure, can be cheaply manufactured, and are entirely accessible should it be necessary to repair or renew any of them.

The preferred embodiment of the invention is illustrated herewith and shown applied to a sled. It will be seen, however, upon an inspection of the claims that this embodiment is open to various changes and modifications.

In the drawings, Figure 1 is a perspective view of a well-known form of hand-sled, showing the invention applied thereto. Fig. 2 is a longitudinal sectional view of the same, showing the parts just prior to the disconnection between the actuating-lever and carrier-bar. Fig. 3 is a section similar to Fig. 2, but showing the parts after said disconnection. Fig. 4 is a horizontal sectional view through Fig. 2. Fig. 5 is a similar view through Fig. 3. Fig. 6 is a detail perspective view of the carrier-bar and spur. Fig. 7 is a detail perspective view of the link. Fig. 8 is a cross-sectional view taken on the line *x x* of Fig. 4.

Similar reference-numerals indicate corresponding parts in all the figures of the drawings.

The hand-sled illustrated in the accompanying drawings is of the well-known form comprising spaced runners 10, connected by cross-rails 11, upon which is supported a platform 12. The runners are provided with suitable hand-openings 13 and spring-shoes 14. So far as described the illustrated structure constitutes no part of the present invention, and any other form of vehicle suitable for the purpose may be applied instead.

The propelling mechanism consists of two independent members mounted, respectively, on the runners. As these members are duplicates, it will only be necessary to describe one.

Secured to the inner face of the runner by suitable bolts are guide-ears 15, in which is slidably mounted a carrier-bar 16, that is thus movable longitudinally of the runner, the front end of said bar being provided with an offset lug 17, constituting a stop that engages the foremost guide-ear to limit the rearward movement of the bar. The rear end of the carrier-bar is bent downwardly, as shown at 18, and carries a crescent-shaped spur 19, that is pivoted between its ends thereto, the swinging movement of the spur being limited in one direction by a projection 20, arranged to engage the bar when the spur is in substantially vertical position, as illustrated in Figs. 3 and 6. The rear face of the upper portion of the spur is arranged to engage the rearmost guide-ear when the carrier-bar is moved forwardly, and at the same time the downwardly-curved portion 18 of said bar moves into the ear, thereby elevating both itself and the spur. The carrier-bar is urged to its rearmost position by a coiled spring 21, secured at one end to one of the cross-rails 11, the other end being attached to a lip 22, fastened to the carrier-bar between the guide-ears. The front portion of the carrier-bar is provided with a longitudinally-disposed slot 23, having at its rear end an enlarged socket 24.

A bracket 25 is secured to the runner and projects above the upper edge of the same. This bracket constitutes a support for an actuating-lever 26, pivoted between its ends to the bracket and having its upper end formed into a suitable handle 27. The movement of the lever in one direction is limited by a stop-finger 28, having an offset terminal that engages the bracket. The lower arm 29 of the lever is preferably offset from the handle portion, and to its lower end is pivoted a link 30, having its rear end offset, as shown at 31, and provided with a stud 32, that slidably engages in the slot 23 of the carrier-bar. This stud has an enlarged portion 33, which is adapted to engage in the socket 24, and in order to insure such engagement when the enlargement and socket are in alinement a coiled spring 34 is arranged upon the stud and interposed between its head 35 and a washer 36, that bears against the outer face of the carrier-bar. The main portion of the link 30 is free of the front guide-ear 15; but said ear is located in the path of movement of the offset end 31, and when the link moves forward the end 31 engaging the same will be moved laterally, consequently moving the stud in a similar direction.

The operation of the mechanism is as follows: Assuming the parts in the position shown in Figs. 3 and 5, it will be seen that when the handle of the lever is moved forwardly the link will move rearwardly until the stud alines with the socket 24 of the carrier-bar, whereupon the spring 32 will cause the stud to move outwardly, thus bringing the enlarged portion thereof into the socket. As a result the lever and the carrier-bar are detachably connected, and if the handle is now moved rearwardly the carrier-bar will move toward the front end of the sled. The spur, being loose, will move freely over the surface during this movement, and as the downwardly-curved portion of the bar passes into the rear guide-ear the spur will be elevated and simultaneously swing by its engagement with said ear to a vertical position. This elevation is sufficient, however, to leave the lower end clear of the surface. Simultaneously with this operation the offset end 31 of the link is approaching the front guide-ear, and as the spur moves to its vertical or operative position said offset end 31 rides upon the guide-ear, and consequently, being moved inwardly, carries the enlarged portion 33 of the stud out of the socket. During this forward movement of the carrier-bar the return-spring is elongated, and as soon as the stud disengages from the socket said spring acting upon the freed carrier-bar projects it toward the rear end of the sled. The spur, however, now lowers as the downwardly-curved rear end of the bar moves out of the rear guide-ear. Thus said spur is brought into engagement with the road or surface, so that the spring acting upon the carrier-bar will propel the sled forwardly. This movement may be continued by actuating the two levers, and by actuating the two independent members said sled can be steered in any direction desired.

It will be apparent from the illustrations that this structure can be readily manufactured at small cost and can be applied to a sled of well-known form. The mechanism does not interfere or constitute a drag upon the free movement of the sled when traveling under its own momentum or coasting, and energy which can be successively stored in the springs will cause the sled to travel at any rate of speed desired.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with a vehicle, of propelling means therefor, actuating mechanism for the propelling means arranged to detachably connect with the same, and means separate from the actuating mechanism for effecting the disengagement of said mechanism and propelling means.

2. The combination with a vehicle, of propelling means therefor, actuating mechanism for the propelling means arranged to detachably connect with the same, and means located in the path of movement of the parts for effecting disengagement between the actuating mechanism and propelling means.

3. The combination with a vehicle, of propelling means therefor, actuating mechanism for the propelling means arranged to detachably connect with the same, means separate from the actuating means for effecting disengagement between the same and the propelling means, and a spring for moving the propelling means when disengaged.

4. The combination with a vehicle, of propelling means therefor, actuating mechanism for the propelling means arranged to detachably connect with the same, means located in the path of movement of the parts for effecting disengagement between the actuating means and propelling means, and a spring for moving the propelling means when disengaged.

5. The combination with a vehicle, of propelling means therefor, an oscillatory actuating-lever, and a device connecting the lever and propelling means during their movement in one direction and disconnecting them to permit their independent movement in an opposite direction.

6. The combination with a vehicle, of propelling means therefor, an oscillatory actuating-lever, and a device connecting the lever and propelling means during the forward movement of the propelling means and the lower end of the lever, and disconnecting them during the rearward movement of the same.

7. The combination with a vehicle, of propelling means therefor, an oscillatory lever having a connection with the propelling means for moving the same in one direction, and means for disconnecting the lever from the propelling means at one end of its stroke.

8. The combination with a vehicle, of propelling means therefor, an oscillatory actuating-lever detachably connected with the propelling means for moving the same in one direction, and means for engaging and disengaging the connection from the propelling means at the ends of the stroke of the lever.

9. The combination with a vehicle, of reciprocatory propelling means therefor, an oscillatory actuating-lever, and a detachable connection between the lever and the propelling means.

10. The combination with a vehicle, of reciprocatory propelling means therefor, a spring for moving the propelling means rearwardly with respect to the vehicle, and an oscillatory actuating-lever for moving the propelling means in a forward direction with respect to the vehicle.

11. The combination with a vehicle, of propelling means therefor, a spring for moving the propelling means toward the rear end of the vehicle, and an oscillatory actuating-lever having a detachable connection with the propelling means for moving the propelling means toward the front of the vehicle.

12. The combination with a vehicle, of reciprocatory propelling means therefor, an oscillatory actuating-lever detachably connected with the propelling means for moving the same in one direction, means connecting the lever to the propelling means at the rear end of its stroke and disconnecting it from the propelling means at the front end thereof, and a spring for moving the propelling means rearwardly when disconnected from the lever.

13. The combination with a vehicle, of propelling means therefor, a reciprocatory link having a detachable connection with the propelling means, and means for automatically detaching the link from the propelling means.

14. The combination with a vehicle, of reciprocatory propelling means therefor, a spring for operating the means in one direction, and a reciprocatory link having a detachable connection with the propelling means to move the same against the action of the spring.

15. The combination with a vehicle, of propelling means therefor, actuating mechanism, a link detachably connecting the actuating mechanism and propelling means, and means for automatically disconnecting the link from one.

16. The combination with a vehicle, of reciprocatory propelling means, actuating mechanism therefor, a connection between the actuating mechanism and the propelling means, and a device located in the path of movement of the connection to throw the same to an inoperative position with relation to said mechanism and means.

17. The combination with a vehicle, of a carrier-bar, an oscillatory actuating-lever, a connection between the bar and lever having a slidable engagement with one, and means for preventing said slidable engagement during the movement of the bar and lever in one direction.

18. The combination with a vehicle, of a slide-bar, actuating means, a link detachably connecting the actuating means and slide-bar during their movement in one direction, and means for effecting the detachment of the link when the bar and actuating means have moved a predetermined distance.

19. The combination with a vehicle, of a slide-bar, an actuating-lever, and a link arranged to detachably connect the lever and bar and slidably associated with one when they are disconnected.

20. The combination with a vehicle, of a slide-bar mounted thereon, an actuating-lever, a link arranged to detachably connect the lever and bar, a device for detaching the link from one of the parts when in one position, and another device for reëngaging the link when in another position.

21. The combination with a vehicle, of propelling means therefor, including a carrier-bar, actuating means, including a link, a device for detachably connecting the bar and link, and means for throwing the device to operative and inoperative positions.

22. The combination with a vehicle, of propelling means, including a carrier-bar having a socket, and actuating means, including a stud, that is automatically movable into and out of the socket.

23. The combination with a vehicle, of propelling means, including a carrier-bar having a longitudinal slot and an enlarged socket, and a link having a stud that slidably engages in the slot and is provided with an enlarged portion arranged to move into the socket.

24. The combination with a vehicle, of propelling means, including a carrier-bar having a longitudinal slot and an enlarged socket at one end, a link having a stud that slidably engages in the slot and is provided with an enlarged portion arranged to move into and out of the socket, and a spring carried by the stud for moving the latter into said socket.

25. The combination with a vehicle, of a carrier-bar slidably mounted upon the vehicle, a road-engaging spur carried by the bar, said bar having a longitudinally-disposed slot provided at one end with an enlarged socket, an actuating-lever pivoted between its ends upon the vehicle, a link pivoted at one end to the lower end of the lever and having its other end offset, a stud carried by said offset end and slidably arranged in the slot of the carrier-bar, said stud having an enlarged portion arranged to fit in the socket thereof, a spring for moving the stud into the socket, and a projection in the path of movement of the offset end of the link to move said end laterally to disengage the stud from the socket.

26. The combination with a vehicle, of propelling means therefor, including a swinging road-engaging spur, and means located in the path of movement of the spur to swing the same with respect to the remainder of the propelling means and into a position to engage the road.

27. The combination with a vehicle, of a movable carrier, a road-engaging spur having a swinging movement upon the carrier, and a stop located in the path of movement of the spur to swing the same upon the carrier.

28. The combination with a vehicle, of a reciprocatory carrier-bar movable toward and from the front of the vehicle, a road-engaging spur pivoted on the bar, and a stop located in the path of movement of the spur to swing the same upon the bar.

29. The combination with a vehicle, of a movable carrier mounted thereon, a spur pivotally mounted on the carrier, and means for lifting the carrier and swinging the spur on the carrier upon the elevation of the latter.

30. The combination with a vehicle, of a guide-ear located thereon, a carrier-bar slidably mounted in the guide-ear and having a depending end that is movable into said ear, and a spur pivoted upon the depending end and arranged to engage the ear.

In testimony that I claim the foregoing as my own I have hereto affixed my signature in the presence of two witnesses.

JEREMIAH R. KNAPP.

Witnesses:
 JOHN M. BECHTOL,
 E. D. SACKETT.